United States Patent [19]

Tolman et al.

[11] Patent Number: 5,130,018
[45] Date of Patent: Jul. 14, 1992

[54] DESICCATION SYSTEM WITH COUPLED TETHER AND PROTECTIVE CAGE

[75] Inventors: Travis G. Tolman, South Jordan; William H. Blackburn, Provo; Orson M. Baumann, Midvale, all of Utah

[73] Assignee: Dewatering Systems International, Inc., South Jordan, Utah

[21] Appl. No.: 248,916

[22] Filed: Sep. 22, 1988

[51] Int. Cl.⁵ .............................. B01J 20/22
[52] U.S. Cl. .................... 210/172; 206/204; 210/238; 210/282; 210/484; 210/DIG. 6
[58] Field of Search ............... 34/95; 206/204, 524.7; 208/187; 210/238, 241, 282, 470, 484, 502, 679, 689, DIG. 6

[56] References Cited

U.S. PATENT DOCUMENTS

| | | | |
|---|---|---|---|
| 3,441,140 | 4/1969 | Thurber | 210/170 |
| 3,744,639 | 7/1973 | Teeple, Jr. et al. | 210/265 |
| 3,745,659 | 7/1973 | Hsu | 33/126.7 |
| 3,935,099 | 1/1976 | Weaver et al. | 210/43 |
| 3,951,812 | 4/1976 | Hsu | 210/282 |
| 4,124,116 | 11/1978 | McCabe, Jr. | 206/204 |
| 4,146,277 | 3/1979 | Santoro | 206/204 |
| 4,160,059 | 7/1979 | Samejima | 428/288 |
| 4,242,206 | 12/1980 | Estabrooke | 210/489 |
| 4,419,236 | 12/1983 | Hsu | 210/689 |
| 4,505,727 | 3/1985 | Cullen et al. | 210/282 |
| 4,588,505 | 5/1986 | Wallex et al. | 34/95 |
| 4,758,350 | 7/1988 | Pitts et al. | 210/484 |
| 4,772,300 | 9/1988 | Cullen et al. | 206/204 |
| 4,783,206 | 11/1988 | Cullen et al. | 206/204 |
| 4,792,399 | 12/1988 | Haney et al. | 210/484 |
| 4,840,734 | 6/1989 | Johnson | 210/484 |
| 4,861,469 | 8/1989 | Rossi et al. | 210/DIG. 6 |
| 4,861,470 | 9/1989 | Casey | 210/DIG. 6 |

OTHER PUBLICATIONS

"Introducing Sta-Dri," Published by Sta-Dri, Inc. (Circa 1987).

Primary Examiner—Robert A. Dawson
Assistant Examiner—Joseph Drodge
Attorney, Agent, or Firm—Berne S. Broadbent

[57] ABSTRACT

A tethered container of desiccant and a surrounding protective cage for entry into an enclosed space to extract moisture. The weight of the cage serves as ballast to settle the assembly to the bottom of any nonaqueous fluid in the enclosed space. In one embodiment, the cage takes the form of an elongated cylinder with perforated side walls slideably mounted on a tether cable disposed through an eye in a solid end wall at one end of the cylinder. The end of the tether cable interior of the cage is attached to the container of desiccant. Preferably, the eye is located on the longitudinal axis of the cylindrical cage to enhance mobility of the device. An access opening in a portion of the cage opposite the eye permits removal of the desiccant container from the cage by sliding the cage along the tether cable away from the desiccant container. In an alternate embodiment, the tether cable opening is selectively closeable to restrain the desiccant container or its contents. The desiccant container is contemplated as selectively openable for recharging the desiccant therein and is made of water-permeable fabric.

9 Claims, 2 Drawing Sheets

DESICCATION SYSTEM WITH COUPLED TETHER AND PROTECTIVE CAGE

BACKGROUND

1. Field of the Invention

This invention relates to systems employing desiccants to extract unwanted moisture, alone or mixed as a contaminant with the contents, in tanks and large enclosed spaces. More particularly, the invention relates to such systems as are employed to remove condensed, entrained, or emulsified water from reservoirs of hydrocarbonaceous fluids. Such reservoirs might typically include vehicle fuel tanks and fuel or oil storage tanks above or below the ground.

2. Background Art

The infiltration of moisture into the contents of large storage containers presents a problem in many areas. In grain storage silos, for example, the presence of excessive moisture in the contents can have ruinous consequences. Often, such moisture results from leakage into the silo or from condensation therewithin.

Water infiltration into and the resultant contamination of hydrocarbon fluids due to condensation, hydroscopic attraction, and poor container closures is also a problem of substantial concern with regard to hydrocarbon fuels and oils. Tank and delivery systems that must utilize contaminated fuels suffer from problems such as icing, rust, and algae growth caused by water. Additionally, water causes damage to close-tolerance devices, such as fuel injector pumps and injection nozzles that rely for lubrication upon the passage of fuel that is contaminated by water.

A number of chemical solutions to water infiltration have been devised. Alcohol, for example, allows water to solubilize in a hydrocarbon and thus acts as an antifreeze. Nevertheless, alcohol can cause even greater damage to close-tolerance devices than does water because of its solvent action. Recently, some non-alcohol based additives have been devised toward this same end, but both types of additives must be added to the products with which they are used at an arbitrary ratio due to the inability to make an accurate prediction as to how much water will eventually become present in the oil or fuel involved. Where the conditions of storage or manner of handling lead to excessive water contamination, such additive-treated hydrocarbon products may thus be deceptively assumed to not pose the risks mentioned above from water contamination.

In larger storage tanks for fuel and oil, infiltrating water will frequently accumulate in a pool at the bottom of the container, below the hydrocarbon product. Sophisticated devices are available that measure the amount of water in such pools. These devices alert an operator when a predetermined water level is reached, so that the water can be drained, if by good fortune the tank has been so designed and constructed. Nevertheless, such devices are far from economical in smaller storage tanks, such as the fuel tanks on trucks, airplanes, and certain recreational vehicles, such as snowmobiles. The tanks on these vehicles are often subjected to extreme temperature conditions and changes, which exacerbate the condensation of moisture and its potential for assuming a solid state.

As an alternate method of removing the water from such enclosures and the contents therein, water-specific absorbent materials, such as desiccants, have been employed. In one instance, a soaking device comprising such a desiccant and a ballast for settling the device in a hydrocarbonaceous fluid are secured within a tethered pouch and lowered into the tank from which water is to be removed. The use of specific types of fabric in the pouch and reusable desiccants can permit water to be mechanically wrung out of the pouch so that it may be employed repeatedly. Such devices are, however, vulnerable to rupture from protrusions on the interior of such tanks, and the weight of the ballast within the pouch can be a source of mechanical strain on the fabric thereof, also leading to rupture of the pouch. The subsequent release of desiccant and ballast is frequently a more damaging contamination than the water the apparatus was designed to remove.

As mentioned previously, water in storage containers of gasoline and oil will seek the lowest point in the storage container and accumulate there. Unfortunately, desiccant containers of the type described above are most often soft, bag-like structures so designed to accommodate the expansion of the desiccant therein as moisture is absorbed. These desiccant containers by lacking rigidity, tend to remain on the floor of the storage container where they first land. Unless the container floors involved are sufficiently steep, these flacid bag-like structures cannot be induced to seeking the lowest point in the container where unwanted water is most likely to be accumulated. As a result inadequate or unacceptably slow extraction of water is effected.

SUMMARY OF THE INVENTION

One object of the present invention is to produce an improved system for removing moisture from confined spaces, and particularly confined spaces in which are stored nonaqueous fluids, such as gasoline and oil. The system disclosed utilizes a desiccant constrained in an expandable desiccant container.

Another object of the present invention is an apparatus for use in a system as described above which protects the desiccant container utilized from damage or rupture during its entry into, presence in, or extraction from the confined space from which moisture is to be extracted.

Still another object of the present invention is a desiccation apparatus as described above which is easily maneuverable in and out of the entry way to such a confined enclosure.

Additionally, it is an object of the present invention to produce a desiccation apparatus which readily settles to the bottom of nonaqueous fluids, but which employs a ballast which will not tend to rupture the desiccation container itself or to separate therefrom.

Yet another object of the present invention is a desiccation apparatus as described above with enhanced mobility whereby the apparatus is facilitated in migrating to the lowest point in a container from which moisture is being extracted.

Additional objects and advantages of the invention will be set forth in the description which follows, and in part will be obvious from the description, or may be learned by the practice of the invention. The objects and advantages of the invention may be realized and obtained by means of instruments and combinations particularly pointed out in the appended claims.

To achieve the foregoing objects, and in accordance with the invention as embodied and broadly described herein, a desiccation system for effecting removal of water from a confined enclosure is disclosed in one embodiment of the present invention as including a quantity of desiccant, a water-permeable, closed desiccant container housing the quantity of desiccant, and enclosure means substantially surrounding the desiccant container for shielding the desiccant container from direct contact with inside surfaces of the enclosure and for affording contact with the desiccant container by the contents of the enclosure. A tether is employed for retrieving the desiccant container and the enclosure means from the tank.

Preferably, the enclosure means of the present invention comprises a cage having perforated walls. One wall of the cage is provided with an access opening through which the desiccant container may be withdrawn from the cage The tether is either removably attached to another of the walls of the cage or, after passing through an eye formed therethrough, is removably attached to the desiccant container itself. In the former case, the access opening is selectively closeable to restrain the desiccant container inside the cage. In the latter instance the removal of the desiccant container from the cage is effected by sliding the cage along the tether, and the access opening need not be closeable.

In a preferred embodiment of the cage utilized in the enclosure means of the present invention, semi-flexible mesh side walls are combined with a convex, streamlined end wall at a first end of the cage. An eye in which the cable is slideably disposed is formed at a central portion of the end wall. Thus with the end of the cable interior the cage attached to the desiccant container, the cage may rotate about the cable in order to travel on the bottom of an enclosure to the lowest point thereof.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings Understanding that these drawings depict only typical embodiments of the invention and are therefore not to be considered limiting of its scope, the invention will be described with additional specificity and detail through use of the accompanying drawings in which.

DESCRIPTION OF THE PREFERRED EMBODIMENTS

Figure 1:
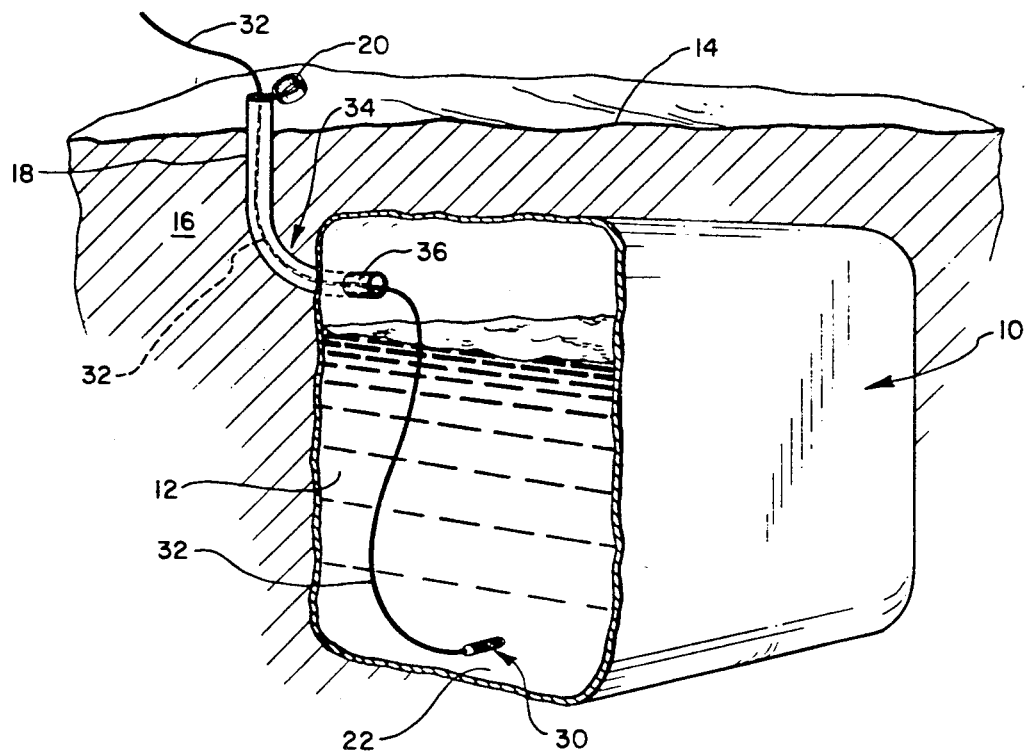
FIG. 1 is a perspective cross-sectional view of a desiccation apparatus according to the present invention being used to remove water from an underground tank of hydrocarbonaceous fluid.

FIG. 1 illustrates one form of a desiccation system according to the teachings of the present invention in use to remove water from a confined enclosure, such as a tank 10 for a hydrocarbonaceous or other type of fluid 12 installed below the surface 14 of the ground 16. An access pipe 18 having a closure lid 20 at surface 14 permits the entry of fluid 12 into tank 10. It is the purpose of the system of the present invention to remove from tank 10 any moisture emulsified or entrained in fluid 12 or pooled therebelow on floor 22 of tank 10. Such moisture is often a result of water leakage into or condensation within storage tanks or the contamination of the fluid stored therein at an earlier stage in its handling.

In order to remove such moisture, a desiccation apparatus 30, to be described in greater detail subsequently, has been lowered through access pipe 18 into tank 10. The weight of desiccation apparatus 30 has caused it to settle to floor 22 of tank 10. Desiccation apparatus 30 contains a strongly water absorbent material with which to collect any moisture in tank 10. A tether 32 attached to one end of desiccation apparatus 30 permits the removal of desiccation apparatus 30 from tank 10 whenever appropriate. The design of desiccation apparatus 30 is such as to enable its withdrawal past obstacles, such as a bend 34 in access pipe 18 or an overhang 36 of the lower end of access pipe 18 which projects into the interior of tank 10.

Figure 2:
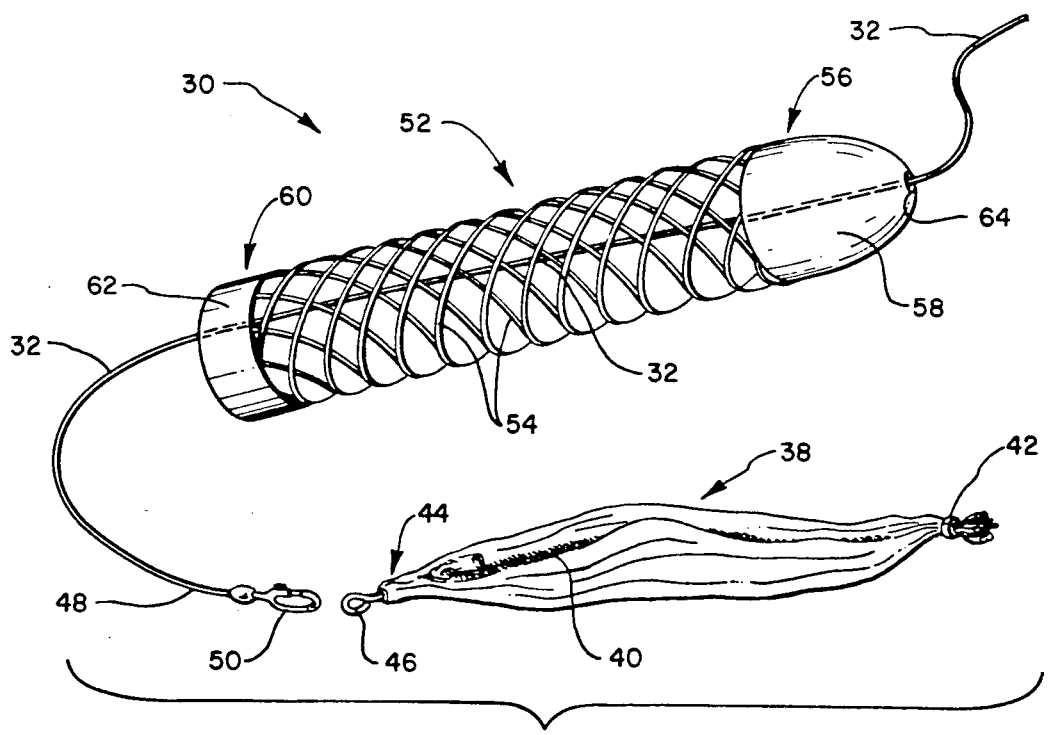
FIG. 2 is a perspective disassembled view of the components of the desiccation apparatus shown in FIG. 1.

Desiccation apparatus 30 and the end of tether 32 attached thereto are shown in greater detail in a disassembled form in FIG. 2. A water-permeable desiccant container 38 is provided for housing a quantity of highly water-absorbent desiccant, which to improve clarity is not shown. One example of a desiccant which is suitable to the purposes of the present invention is starch-graft polyacrylonitrile copolymer (GS-HPAN). Other suitable equivalents are known in the art and will be described later. The present invention pertains to the use of any absorbent which can be adequately contained within desiccant container 38. Correspondingly, the walls of desiccant container 38 need be such as to prevent dispersal into tank 10 of the chosen desiccant material utilized, while yet permitting water to pass through the walls of desiccant container 38 for absorption by the desiccant material within.

To permit its reusability, desiccant container 38 is optionally provided with a zipper 40 or other means of selective closure, whereby the charge of desiccant material housed within desiccant container 38 may be removed and renewed. It should also be noted that the desiccant container of the present invention need not be selectively openable as by the inclusion of a zipper 40, but may be contemplated as self-disposable with desiccant contained therein as needed.

As seen in FIG. 2, desiccant container 38 is a soft elongated fabric tube crimped closed at a first end 42 thereof and provided at the opposite end 44 with an attachment loop 46 by which desiccant container 38 is secured to other elements of desiccation apparatus 30 and to tether 32. While desiccant container 38 is shown in FIG. 2 as taking the form of a flexible sock-like structure, a self-sustaining structure compatible with the other components of the inventive desiccation system is also contemplated as within the scope of the present invention. The end 48 of .tether 32 is provided with a means for attaching end 48 to desiccant container 38. As shown by way of illustration, end 48 of tether 32 is provided with a manually openable clip 50 which may be selectively secured to attachment loop 46.

According to one aspect of the present invention, enclosure means are provided for shielding desiccant container 38 from direct contact with inside surfaces of tank 10 and yet for affording contact with desiccant container 38 by fluid 12 and any moisture within tank 10. As shown by way of example and not limitation, such an enclosure means may take the form of an elongated cylindrical cage 52 having perforated side walls 54 made of thin mesh material. The thickness of side walls 54 may be designed with varying degrees of rigidity, depending upon the contemplated use for desiccation apparatus 30. Where substantial weight will be imposed laterally upon side walls 54, such as in the extraction of moisture from tall silos of grain, rigidity is advised. Nevertheless, where desiccation apparatus 30 must negotiate tortuous entrance passageways to the closed space in which it is to be used, a degree of lateral flexibility consistent with the other objects of the invention is desirable. It is not atypical that the entrance nozzle to a vehicle fuel tank includes one or more bends, such as bend 34 shown in FIG. 1 in access pipe 18 to tank 10.

A first end 56 of cage 52 is formed into a closed end wall 58, which adds rigidity to cage 52. Shaping end wall 58 in a convex, stream-lined manner as shown in FIG. 2 advantageously eases the extraction of cage 52 from any enclosure in which it is used. Negotiating overhang 36 in FIG. 1 is facilitated by the slope of end wall 58 as shown in FIG. 2. In addition the shape of end wall 58 and a degree of flexibility in cage 52 enables desiccation apparatus 30 to be maneuvered through bend 34 in access pipe 18. The second end 60 of cage 52 may optionally be provided with a reinforcing ring 62, which also adds rigidity to the structure of cage 52.

Through end wall 58 is formed an eye 64 through which tether 32 is slideably disposed. Advantageously eye 64 is formed on the longitudinal axis of cage 52, and in this manner permits cage 52 to rotate about tether 32, whereby to travel to the lowest point on the floor of the enclosed space within which desiccation apparatus 30 is being utilized. This aspect of cage 52 will become more readily appreciated through a study of FIG. 3 in which the components of desiccation apparatus 30 shown in FIG. 2 are illustrated assembled one with another.

Figure 3:
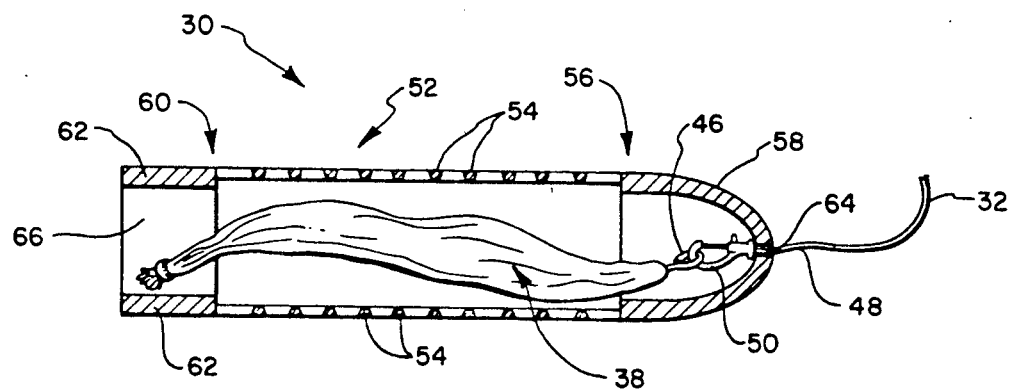
FIG. 3 is a cross-sectional assembled view of the desiccation apparatus shown in FIG. 2.

As shown in FIG. 3, clip 50 on end 48 of tether 32 has been removably secured to attachment loop 46 of desiccant container 38. Thereafter, tether 32 is withdrawn through eye 64 in end wall 58 until desiccant container 38 is drawn into cage 52 through an access opening 66 at the center of reinforcing ring 62. Clip 50 is so configured as to preclude the passage of end 48 of tether 32 through eye 64 when cage 52 slides along tether 32 toward end 48.

The arrangement shown in FIG. 3 permits cage 52, by substantially surrounding desiccant container 38, to protect desiccant container 38 from contact with interior surfaces of the enclosure in which it is used. More specifically cage 52 protects desiccant container 38 from rupture due to encounters with sharp or ragged obstructions during its use. Nevertheless, when lying on the bottom of a tank, such as tank 10, perforated side walls 54 permit desiccant container 38 to lie as close as possible to the bottom of that container, where water extraction by the desiccant container is likely to be highly effective.

In addition to the protection of desiccant container 38, it is a second function of cage 52 to provide adequate ballast external to desiccant container 38 to settle desiccant container 38 to the bottom of a nonaqueous fluid, such as fluid 12 shown in FIG. 1. In this manner, the weight of the ballast associated with desiccant container 38 will not subject the walls of desiccant container 38 to stresses which may result in rupture. The integral construction of cage 52 and the coupling thereof to tether 32 in the manner shown in FIG. 3 ensures that this ballast does not itself become a contaminant in the enclosure from which moisture is being removed.

Figure 4:
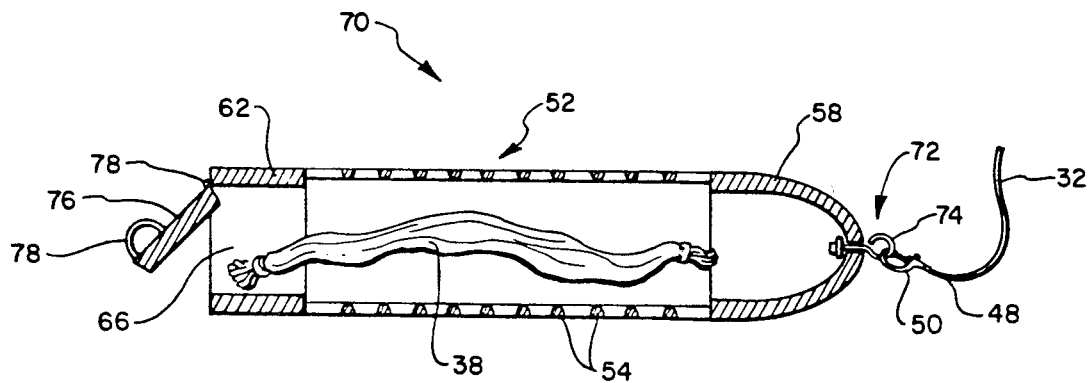
FIG. 4 is a cross-sectional assembled view of a second embodiment of a desiccation apparatus like that shown in FIG. 3.

FIG. 4 shows a second embodiment 70 of a desiccation apparatus, such as desiccation apparatus 30 shown in FIGS. 2 and 3, constructed according to the teachings of the present invention. Wherever possible, substantially similar corresponding structures in second embodiment 70 of desiccation apparatus 30 will be referred to by identical reference characters. In second embodiment 70 end wall 58 of cage 52 has been modified from that shown in FIG. 3 by the permanent attachment thereto of an eye-bolt 72 with the loop 74 thereof extending outwardly from cage 52. The use of suitable hardware to connect eye-bolt 72 to cage 52, or a swivel connection between clip 50 and end 48 of tether 32, will permit cage 52 to rotate about eye-bolt 72 in the manner that cage 52 in FIG. 3 is rotatable about tether 32 disposed through the eye.

In second embodiment 70 desiccant container 38 is attached neither to tether 32 nor to cage 52. Instead, access opening 66 is rendered selectively closable in order to contain desiccant container 38 within cage 52. This is accomplished by the provision of a cap 76. If cage 52, or at least reinforcing ring 62 thereof, is formed of plastic, cap 76 may advantageously be attached thereto as well as be biased into a position closing access opening 66 through the use of an integrally moulded hinge 78. The opening of cap 76 is facilitated by a handle 80 attached to the exterior thereof.

Figure 5:
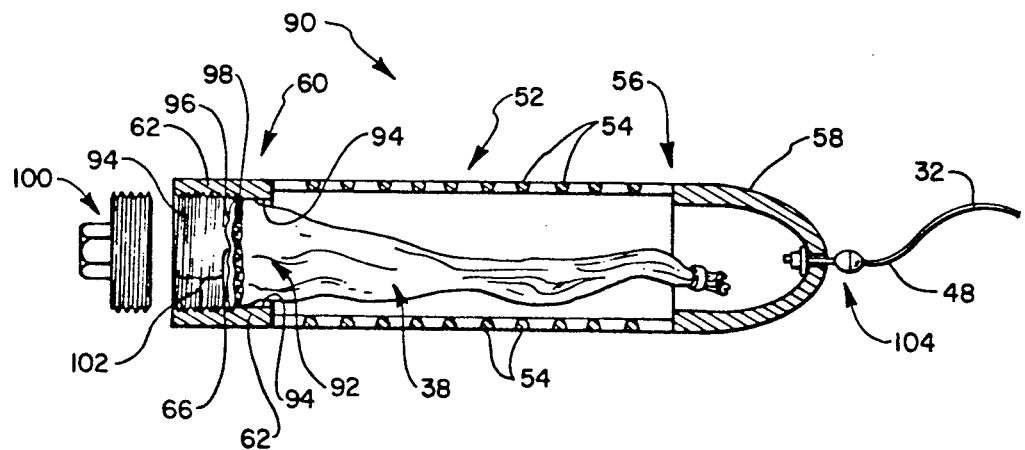
FIG. 5 is a cross-sectional view of a third embodiment of a desiccation apparatus like that shown in FIG. 3.

FIG. 5 shows a third embodiment 90 of a desiccation apparatus, such as desiccation apparatus 30 in FIGS. 2 and 3, constructed according to the teachings of the present invention. Wherever possible, substantially similar corresponding structures in third embodiment 90 and desiccation apparatus 30 will be referred to by identical reference characters. In third embodiment 90 desiccant container 38 is attached to cage 52. While such an attachment may be effected at almost any convenient point of contact between desiccant container 38 and the interior of cage 52, in third embodiment 90 the end 92 of desiccant container 38 adjacent to second end 60 of cage 52 is continuously attached to the inner surface 94 of reinforcing ring 62. This attachment may be permanently effected by the use of adhesive, ultrasonic or heat bonding, or any other suitable means known in the art. Nevertheless, the attachment need not be permanent. It would be adequate, for example to provide a circumferential groove on inner surface 94 into which could snap a correspondingly sized retaining ring. The retaining ring would be snapped into place only after end 92 of desiccant container 38 had been positioned in access opening 66. Then, the ring would removably clamp end 92 of desiccant container 38 into the retaining groove.

As illustrated, end 92 of desiccant container 38 terminates at a continuous edge 96 which is permanently held open to permit the entry of desiccant into and removal from desiccant container 38. Optionally, according to the material from which desiccant container 38 is fabricated, edge 96 thereof may be provided with reinforcing, such as stitching 98 shown in FIG. 5. The entrance to desiccant container 38 through open edge 96 is closeable to effect the retention of desiccant within desiccant container 38 through the use of a threaded plug 100 and cooperating threads 102 on the interior 94 of reinforcing ring 62. In this manner access opening 66 is simultaneously rendered selectively closeable.

In contrast to desiccation apparatus 30 shown in FIG. 3, third embodiment 90 is secured to end 48 of tether 32 by a ball-and-socket mechanism 104 which is permanently secured to cage 52 at end wall 58 thereof. The use of ball-and-socket mechanism 104 allows swiveling to occur between tether 32 and second embodiment 90, thereby permitting second embodiment 90 to roll on the floor of an enclosure in which it is used.

When the desiccant in desiccant container 38 becomes saturated with fluid, desiccant container 38 is removed from cage 52 through access opening 66. In desiccant apparatus 30 shown in FIGS. 2 and 3, this is accomplished by sliding cage 52 along tether 32. Desiccant container 38 attached thereto then emerges from second end 60 of cage 52. On the other hand, in second embodiment 70 shown in FIG. 4, cap 76 is opened and desiccant container 8 removed from cage 52. Then tether 32 remains attached to loop 74 on the exterior of end wall 58. Additionally, in third embodiment 90 shown in FIG. 5, plug 100 is unthreaded from access opening 66 and the entire body of desiccant container 38 may be pulled outwardly from cage 52 for emptying. Upon the reinsertion of desiccant container 38 into cage 52, desiccant container 38 may be filled with fresh desiccant. Somewhat similarly to second embodiment 70 shown in FIG. 4, tether 32 remains attached to the exterior of end wall 58 during this process.

By way of example, a desiccant container made of approximately 200-thread-count nylon being approximately two inches in diameter and approximately fourteen inches long was fabricated substantially in the manner of desiccant container 38 shown in FIGS. 2 and 3. Approximately one ounce of starch-graft copolymer was placed in the desiccant container, which was then removably attached to a stainless steel cable. A polypropylene cage 52 shaped in the manner shown in FIG. 3 was slideably mounted on the cable 80 as to substantially enclose the desiccant container when slid to the end of the tether cable. The resulting desiccation apparatus was lowered into a vehicle tank containing diesel fuel. The apparatus was verified as being able to roll around on the bottom of the fuel tank, and to locate the lowest point therein. All water was absorbed from the bottom of the fuel tank and was easily removed by withdrawing the desiccant container and cage using the steel cable.

In summary, the system of the present invention involves a rigid or semi-rigid perforated cage shaped so as to provide protection to an enclosed desiccant container. The cage preferably has rounded corners to prevent its becoming caught on protrusions or other obstacles in the enclosure in which it is being used. Providing the cage with a streamline shape also facilitates its removal from dense media, such as heavy oils or grains. The cage is sized relative to the expansive capacity of the confined desiccant container and is so constructed that the desiccant container can be easily replaced or refilled. Generally, any material that is non-corrosive in water and unharmful to the intended environment of use is suitable for the cage. Such materials include, in combination or singly, perforated, meshed, or woven stainless steel, brass, or plastic that is impervious to the environment in which the cage is used. Polypropylene, nylon, or polyethylene are examples of plastics suitable in most environments.

The cage not only provides protection to the enclosed desiccant container but also aids in the proper placement of the desiccant apparatus in the enclosed space from which moisture is being removed. If used to remove moisture from a tank containing hydrocarbonaceous fluid, the cage would of necessity incorporate sufficient weight in order to settle the entire device to the bottom of that tank. This could be accomplished by choosing materials of sufficient specific gravity or by attaching or integrally incorporating other forms of ballast to the cage. For example, additional ballast could be attached to the tether cord with which the desiccant apparatus is retrieved.

Additionally, as water is heavier than hydrocarbonaceous fluids, any moisture in a tank containing such fluids, which is not entrained or emulsified with the fluids, will seek the lowest point in the tank. The desiccation apparatus of the present invention is rendered additionally useful toward extracting pooled water in such locations, if rendered cylindrical or spherical in shape, and if the method of attaching the retrieval tether to the cage permits rotation of the cage and the desiccant container therein along the floor of the enclosure from which moisture is being extracted.

The desiccant container of the present invention may have a self-sustaining structure or may be made using any open-mesh cloth or fabric that will allow for the free flow of fluids, while retaining the particles of the water-absorbent desiccant that are to be used in the desiccation system. The material from which the desiccant container is fabricated must also be unharmed by and unharmful to the environment in which it is to be used. If this environment involves hydrocarbonaceous fluids, the walls of the desiccant container must be solvent resistant. If used in a food grade substance, such as in the process of drying grain stored in a silo, the desiccant container must be non-toxic. The efficiency of the reduction of humidity in a confined enclosure is enhanced, if the fabric of the desiccant container has desirable wicking properties, such as those associated with wool. In this manner the conduction of moisture to the absorbent desiccant itself is accelerated. A typical desiccant container as disclosed herein can be constructed from a tube of fabric by crimping both ends thereof. Preferably one such end includes means for fastening the desiccant container to a hook or snap of compatible size.

The desiccant container can be permanently closed around the absorbent desiccant, thereby to become a disposable, replaceable portion of the desiccation apparatus. When the desiccant container reaches full capacity it can be disconnected from the tether with which it is used and replaced with a new desiccant container. Alternatively, the desiccant container can include a zipper or other reuseable closure means, so that as the contents reach full capacity due to water absorption, the desiccant container can be reused by removing and replacing the desiccant material therein.

The desiccant contemplated should be a highly absorbent polymer that has properties harmonious with each desired application. In a hydrocarbon-containing environment, the desiccant must be water-specific and not susceptible to degradation or to dissolution in hydrocarbonaceous fluids. The group of water-absorbent polymers known as "super absorbents" generally fill these requirements. Included in this group are regular and cross-linked polyacrylamides, potassium- and sodiumbased hydrolized starch-polyacrylonitrile copolymers, and carboxymethylcellulose.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A desiccation apparatus for extracting water from hydrocarbonaceous fluid contained in a tank, said desiccation apparatus comprising:
   (a) a quantity of desiccant;
   (b) a non-burstable container housing said quantity of desiccant, the container being:
      (i) water-permeable, and
      (ii) substantially impermeable to said desiccant;
   (c) protective enclosure means substantially surrounding said container, said protective enclosure means being configured so as to allow the free passage of fluid from the tank to said container and said protective enclosure means being sufficiently rigid to prevent rupture of the container upon surface contact with the tank, and wherein said protective enclosure means comprises a cage having perforated walls, said cage comprising:
      (i) an elongated cylinder having mesh sidewalls; and
      (ii) a closed end wall at a first end of said cylinder, an eye being formed through said end wall; and
   (d) a tether operably coupled to said protective enclosure means for retrieving said container and said enclosure means from the tank, said tether being slideably disposed through said eye, and the end of said tether within said cage being attached to said container.

2. A desiccation apparatus as recited in claim 1, wherein said eye is formed on the longitudinal axis of said cylinder, whereby said cage may rotate about said tether.

3. A water extraction apparatus comprising:
   (a) a quantity of desiccant;
   (b) a fabric-walled, flexible, non-burstable container housing said quantity of desiccant, the container being:
      (i) water-permeable, and
      (ii) substantially impermeable to said desiccant;
   (c) an elongated cylindrical protective cage for housing said container, said cage comprising:
      (i) semi-flexible, perforated sidewalls, the sidewalls being configured so as to allow the free passage of water therethrough to said container; and
      (ii) a convex, streamlined end wall at a first end of said cage, an open eye being formed through said end wall at a central portion thereof;
   (d) a cable slideably disposed through said eye in the end wall of said cage, the end of said cable interior said cage being so configured as to preclude passage of said end of said cable from said cage through said eye when said cage slides on said cable towards said end thereof; and
   (e) attachment means on said end of said cable interior said cage for permitting the selective attachment of said cable to said container.

4. A water extraction apparatus as recited in claim 3, wherein said container is selectively and nondestructively openable.

5. A water extraction apparatus as recited in claim 3, wherein an access opening is formed in a second end of said cage opposite from said first end thereof, whereby said container can be withdrawn from said cage through said access opening by sliding said cage along said cable away from said end of the cable.

6. A water extraction apparatus as recited in claim 5, wherein said cage further comprises a cylindrical reinforcing ring at said second end of said cage.

7. A water extraction apparatus as recited in claim 6, wherein said reinforcing ring encircles said access opening.

8. A desiccation apparatus for extracting water dissolved in or pooled at a lower region of a reservoir of a nonaqueous fluid, said desiccation apparatus comprising:
   (a) a desiccant container housing a quantity of dessicant;
   (b) a tether attached to said desiccant container; and
   (c) ballast external to said desiccant container, said ballast being attached to said tether proximate to said desiccant container for settling said desiccant container to said lower region of the reservoir of fluid, said ballast taking the form of a cage substantially enclosing said desiccant container, a first side of said cage being provided with an access opening through which to remove said desiccant container and an eye being formed through a second side of said cage, said tether being slideably disposed through said eye, the end of said tether interior said cage being so configured as to preclude passage of said end of said tether from said cage through said eye when said cage slides on said tether towards said end thereof.

9. A water extraction apparatus comprising:
   (a) a fabric-walled, flexible desiccant container housing a quantity of dessicant;
   (b) an elongated cylindrical cage for housing said desiccant container, said cage comprising:
      (i) semi-flexible, perforated sidewalls; and
      (ii) a convex, streamlined end wall at a first end of said cage, an open eye being formed through said end wall at a central portion thereof;
   (c) a cable slideably disposed through said eye, the end of said cable interior said cage being so configured as to preclude passage of said end of said cable from said cage through said eye when said cage slides on said cable towards said end thereof;
   (d) attachment means on said end of said cable interior said cage for permitting the selective attachment of said cable to said desiccant container; and
   (e) wherein an access opening is formed in a second end of said cage opposite from said first end thereof, whereby said desiccant container can be withdrawn from said cage through said access opening by sliding said cage along said cable away from said end of the cable.

* * * * *